United States Patent Office 3,551,921
Patented Jan. 5, 1971

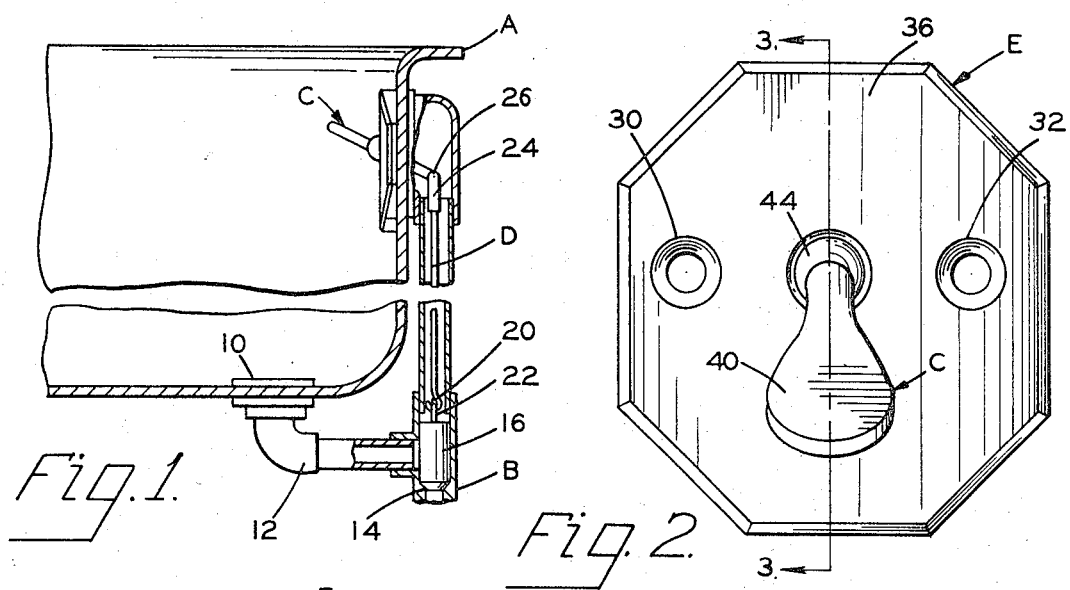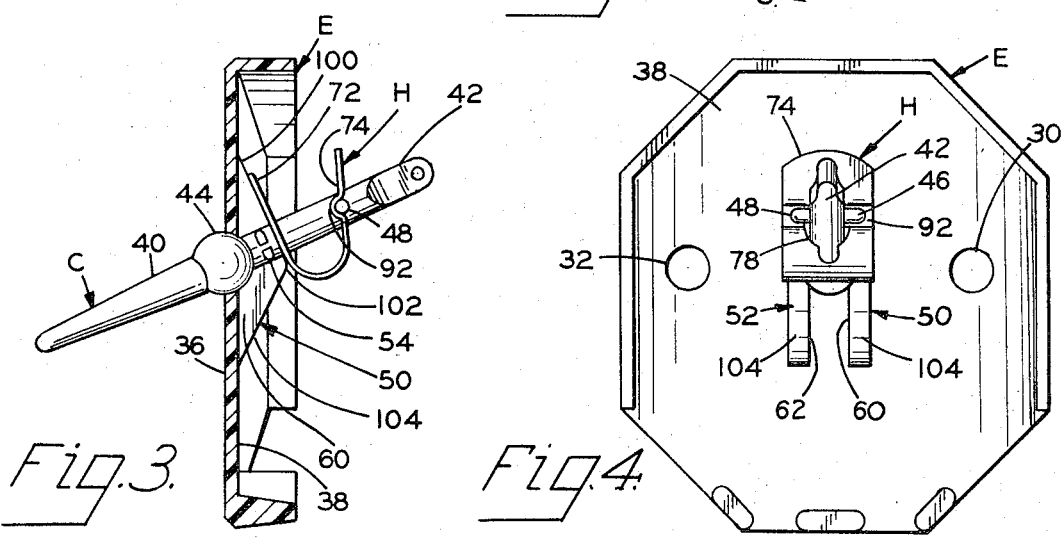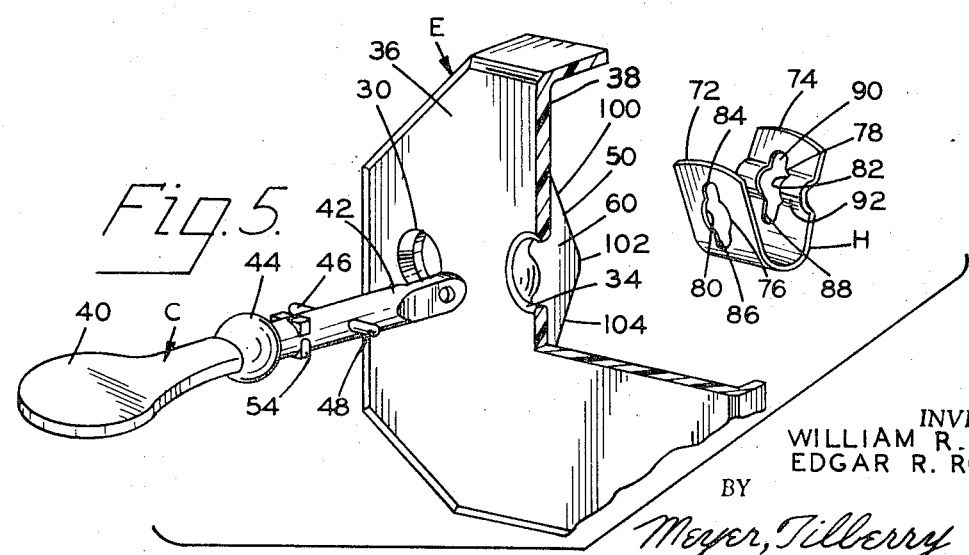

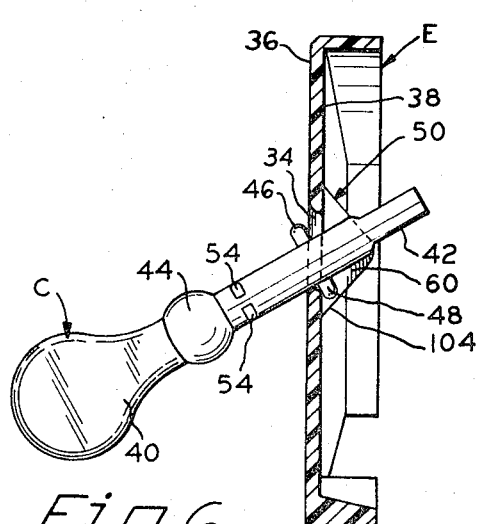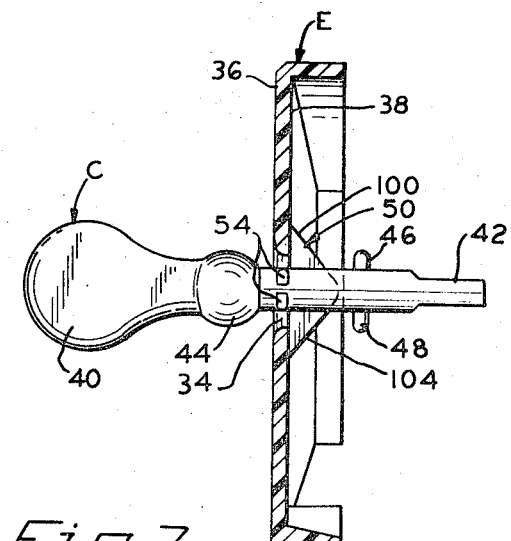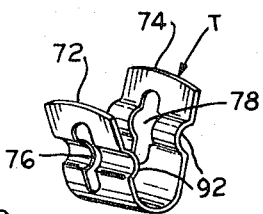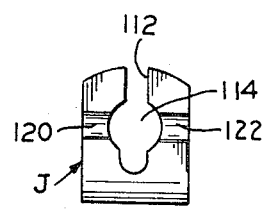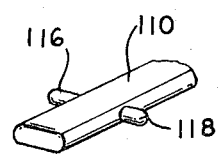

3,551,921
MECHANICAL CONTROL FOR LIQUID
DRAIN STOPPER
William R. Fox and Edgar R. Rowe, Cleveland, Ohio,
assignors, by mesne assignments, to Sajar Plastics Inc.,
Middlefield, Ohio, a corporation of Ohio
Filed June 28, 1968, Ser. No. 741,014
Int. Cl. E03c 1/232
U.S. Cl. 4—199                                            8 Claims

ABSTRACT OF THE DISCLOSURE

A mechanical control for a liquid drain stopper includes a mounting plate having a hole in it and cam means formed on the rear face of the plate adjacent the hole. A lever extends through the hole and a U-shaped spring biases against an abutment on the rear of the lever and against the cam means. Pivoting the front portion of the lever moves the spring from one portion of the cam to another for positioning a drain stopper in either an opened or a closed position.

BACKGROUND OF THE INVENTION

This invention relates to the art of mechanical control devices and more particularly to such a device wherein a toggle lever can be pivoted between two positions to place a controlled member in a desired location.

The invention is particularly applicable to controlling the position of a bathtub or sink drain stopper and will be described with particular reference thereto; however, it will be appreciated that the invention has broader applications and may be used for controlling the position of various movable members, such as a door catch or the like.

A bathtub or sink usually includes a mechanism for opening and closing a drain valve by a remotely located pivoted lever. Many mechanisms have been used; however, one of the more common ones includes an escutcheon plate through which the lever extends. The plate is modified to provide the pivot for the lever, and a two-position cam on the back of the plate coacts with a biasing device to hold the lever in two pivoted positions. In one position the drain is open, and in the other position the drain is closed. Heretofore this biasing device has included a pair of washers on the lever and separated by a coil spring concentric with the lever. The spring forces one of the washers into contact with the cam to hold the lever in a selected one of the aforementioned positions.

This biasing device has been satisfactory; however, it is expensive to produce and to assemble. The present invention relates to an improvement in such a biasing device for operating the drain in a tube or sink which overcomes the disadvantages of prior similar devices.

SUMMARY

In accordance with the present invention, there is provided a mechanical control device for liquid drain stoppers including a mounting plate having a hole in it and cam means formed on the rear face of the plate adjacent the hole. A lever is received in the hole and a single U-shaped leaf spring biases against abutment means on the rear portion of the lever and against the cam means. The abutment means on the rear portion of the lever is integrally formed with the lever, and the legs of the U-shaped spring have special apertures to receive the rear portion of the lever and pass by the abutment means. One leg of the spring is formed with a recess adjacent its aperture and the recess receives the abutment means on the rear portion of the lever. The present invention uses a single spring member to hold the lever in position on the mounting plate and to hold the lever in either an upwardly or downwardly pivoted position.

OBJECTS

It is a principal object of this invention to construct a mechanical toggle, of the type described, with a minimum of parts to accomplish economy and simplified assembly.

It is another object of this invention to form a spring member into a special shape for use with a mechanical toggle, of the type described.

It is a further object of this invention to form such a toggle lever with integral stops and abutments for co-operation with a mounting plate and spring member.

It is another object of this invention to construct such a mechanical toggle using a single spring member to hold the toggle in position on a mounting plate and to cooperate with a cam on the plate for holding the toggle in different positions.

It is also an object of this invention to construct a mechanical toggle with a lever having integral stops and abutments, which are arranged in a special manner for insertion through a hole in a mounting plate.

BRIEF DESCRIPTION OF THE DRAWING

FIG. 1 is a partial cross-selectional elevational view of a bathtub drain embodying the control device of the present invention;

FIG. 2 is a front elevational view of the control device of the present invention;

FIG. 3 is a cross-sectional view thereof taken on line 3—3 of FIG. 2;

FIG. 4 is a rear elevational view thereof;

FIG. 5 is an exploded perspective view thereof with portions cut away for clarity;

FIG. 6 is a side cross-sectional elevational view showing parts at an intermediate assembly stage;

FIG. 7 is the same view as FIG. 6 at a further assembly stage;

FIG. 8 is a perspective view of a modified spring member;

FIG. 9 is a front elevational view of a modified aperture in the leg of the spring member; and FIG. 10 is a perspective view of a lever for use with the spring of FIG. 9.

DESCRIPTION OF THE PREFERRED EMBODIMENT

The invention may take physical form in certain parts and arrangement of parts, a preferred embodiment of which will be described in detail in this specification and illustrated in the accompanying drawings.

FIG. 1 shows the preferred environment of the present invention wherein a bathtub A having a drain outlet 10 leading to an outlet pipe B through connecting pipe 12. Outlet pipe B includes a valve seat 14 closable by stopper 16 which is connected with a vertically pivoted lever C by a rod D.

Rod D may have a hooked bottom end 20 receivable in an eyelet 22 attached to the top of stopper 16. Rod D is connected at its upper end with link 24 pivotally connected with the rear portion of lever C by pin 26.

Movement of lever C downward raises stopper 16 to open outlet pipe to drain 10. Movement of lever C upward lowers stopper 16 against valve seat 14 in outlet pipe B to close drain 10.

An escutcheon or mounting plate E has openings as at 30 and 32 for receiving screws or bolts which secure the mounting plate to a vertical wall of tub A as shown. Mounting plate E has a centrally located circular hole 34 therethrough and opposite sides of plate E define front and rear faces 36 and 38 respectively.

Lever C includes front portion 40 and rear portion 42. A circular or spherical enlargement 44 defines an abutment at an intermediate position along the length of lever C. Rear portion 42 of lever C is received in hole 34 and abutment 44 is positioned against the adjacent surfaces of plate E around hole 34. Rear portion 42 of lever C includes a pair of laterally extending projections 46 and 48 which define stop means.

Rear face 38 of mounting plate E is formed with integral vertically extending flat projections defining cam means 50 and 52 on opposite sides of hole 34. Rear portion 42 of lever C is circular and is formed with a square portion as at 54 defining guide means which strikes against the inside faces of cams 50 and 52 to prevent rotation of lever C in opening 34.

Lever C is preferably molded in one piece with abutment 44, stop means 46 and 48, and squared portion 54 being integral therewith.

Stops 46 and 48 have a considerable lateral span and if lever C were to be moved axially through hole 34 in plate E hole 34 would have to be of considerable size. Squared portion 54 on rod C would then have to have the same lateral extent as stops 46 and 48 in order to contact flattened portions of cams 50 and 52. Also, abutment 44 would have to be considerably larger than shown in order to contact the peripheral walls adjacent the enlarged hole. A manner of keeping hole 34 small and permitting insertion of lever C is shown in FIGS. 6 and 7. Hole 34 is sufficiently larger than the diameter of rear portion 42 of lever C so that the lever can be tilted as shown in FIG. 6 to pass tops 48 through hole 34. The flattened inside surfaces portions 60 and 62 of cams 50 and 52 are spaced apart a distance substantially the same as the lateral dimension of hole 34 so that stops 46 and 48 must be in a vertical position when inserting lever C. With the lever in position as shown in FIG. 6 stop 48 is on the rear side of plate E and stop 46 is one the front side. From this position lever C can be swung upwardly to pass stop 46 through hole 34. Lever C must then be rotated 90° so that stops 46 and 48 are in their proper horizontal position. In rotating lever C it is not possible to have either stops 46 and 48, or squared portion 54 between the flattened portions 60 and 62 of cams 50 and 52. Therefore, the distance between squared portion 54, and stops 46 and 48 is greater than the rearward extent of the flattened portions 60 and 62 on cams 50 and 52. Thus, lever C, may be moved axially inward until stops 46 and 48 clear the cams while squared portion 54 has not yet reached the flattened portions 60 and 62 between the cams 50 and 52 as shown in FIG. 7. Lever C can then be rotated 90° and moved axially inward to position squared portion 54 between the flattened portions 60 and 62 of cams 50 and 52.

In accordance with the present invention, a substantially U-shaped leaf spring member H has a pair of legs 72 and 74 with apertures 76 and 78 therein. Apertures 76 and 78 are elongated to have a long dimension axially of legs 72 and 74, and a short dimension laterally of legs 72 and 74. The long dimensions of apertures 76 and 78 lie on the longitudinal axes of legs 72 and 74, and the apertures are symmetrical about such axes. The central portions 80 and 82 of apertures 76 and 78 are enlarged and circular to fit around the rear portion 42 of lever C while the upper and lower ends 84, 86, 88 and 90 of apertures 76 and 78 are narrower and fit around stops 46 and 48 on lever C. Leg 74 is deformed adjacent aperture 78 to form a recess 92 opening outwardly. Recess 92 is preferably formed at substantially the vertical center point of aperture 78. Circular central portion 82 of aperture 78 is originally punched out elongated so as to be circular after leg 74 is deformed to form recess 92.

The circular central portions 80 and 82 of apertures 76 and 78 preferably have a diameter which is slightly greater than the diameter of rear portion 42 of lever C and the only movement of spring H on rear portion 42 is either rotational or axial. For any lateral movement of rear portion 42 spring H moves with it.

To assemble spring H on rear portion 42 of lever C the lever is first inserted through the hole in the mounting plate as shown in FIGS. 6 and 7 until it is in the position as shown in FIG. 3. Spring H is then rotated 90° from the position shown in FIG. 5 about an axes passing through both apertures 76 and 78. Spring H may then be moved axially along rear portion 42 with stops 46 and 48 passing through the elongated portions 84, 86, 88 and 90 of apertures 76 and 78, and with the circular portion pasing through the central circular portions 80 and 82 of apertures 76 and 78. With abutment 44 contacting the periphery of hole 34 as shown in FIG. 3 the distance from the rear edges of cams 50 and 52 to stops 46 and 48 is somewhat less than the distance between legs 72 and 74 of spring H in a relaxed condition. Spring H must be bent and placed under stress by moving legs 72 and 74 closer together than in their relaxed condition. This is done until leg 74 is behind stops 46 and 48. Spring H is then rotated back 90° until stops 46 and 48 are received in recess 92. Stops 46 and 48 then cooperate with recess 92 to prevent rotation of spring H on rear portion 42 during operation of the control device. The lateral extent of leg 72 is greater than the lateral extent of cams 50 and 52 so there are no hangups in rotating spring H to assembly or during operation of the device. With spring H in position there is a biasing force on lever C due to the spring being stressed against stops 46 and 48, and against the rear edges of cams 50 and 52. This holds abutment 44 snugly against the peripheral portions of hole 34. With front portion 40 of lever C pivoted downward, leg 72 of spring H is substantially flat against an upper flattened portion 100 of cams 50 and 52. To pivot lever C upwardly requires movement of leg 72 of spring H over a central peak portion 102 of cams 50 and 52. This requires further stressing of spring H by moving leg 72 closer to leg 74 and also involves considerable friction between leg 72 and the rear edges of cams 50 and 52. Front portion 40 of lever C may be pivoted upwardly from the position shown in FIG. 3 until leg 72 is substantially flat against the lower flattened portion 104 of cams 50 and 52. The force involved in moving lever C from the position shown in FIG. 3 to a position in which front portion 40 is sloping upwardly requires more force to bend the spring H and overcome friction than that applied by the weight of stopper 16. The upper and lower portions 100 and 104 of cams 50 and 52 against which leg 72 is substantially flat may be termed rest positions. The peak portions 102 of cams 50 and 52 may be termed active portions as they come into play in moving lever C and spring H from one rest position to another. In moving either above or below active portions 102 of cams 50 and 52 toward rest positions 100 or 104, it will be apparent that the stress in spring H places a component of force parallel to rest positions 100 or 104 so that a snap acting movement is obtained once leg 72 passes a certain point on active portions 102. It will be understood that cams 50 and 52 could have more than two flattened portions defining rest areas and more than one portion defining an active area so that lever C could be held in more than two pivoted positions. It is also possible to form recess 92 in both of legs 72 and 74 of spring H as shown in FIG. 8 so that either leg could be positioned against cams 50 and 52 or against stops 46 and 48. By having a recess in each leg an assembler could merely grab a spring from a box and place it in position on rear portion 42 of lever C without having to turn the spring so that a certain leg goes on first. It is also possible to have aperture 78 opening at the upper end of leg 74 so that it could simply be slid over rear portion 42 behind stops 46 and 48 and would then be held in place by the stops and recess 92. Also, apertures 76 and 78 could open at tops of legs 72 and 74 as shown in FIG. 9 and cooperate with a rod or lever having a rear end shaped as shown in FIG. 10 so that portion 110 of the lever is flattened and fits sideways through slot 112 of aperture 114. Spring J of FIG. 9 is otherwise the same as that of FIG. 5 and can be slid sideways over portion 110 of the lever and then rotated 90° until stops 116 and 118 are received in recesses 120 and 122. It will be understood that apertures 76 and 78 could be rotated 90° so their long dimension would be lateral of the longitudinal axis of legs 72 and 74. Stops 46 and 48, and recess 92 would then be vertical and extend longitudinally of the axis of legs 72 and 74. Also, the stops and recess could be on only one side of an aperture rather than on both sides.

It will be obvious to those skilled in the art that other minor modifications and rearrangements could be made to the preferred embodiment which has been described in detail.

We claim:

1. A multiple position control device including a mounting member having opposite sides defining front and rear faces and a hole therethrough with cam means on said rear face adjacent said hole, said cam means having rest portions and active portions, lever means pivotally received in said hole and having front and rear portions positioned respectively on said opposite sides of said mounting member, and stop means on said rear portion spaced rearwardly of said rear face and said cam means, the improvement comprising; a substantially flat U-shaped spring member having a pair of spaced apart leg portions, aperture means in said leg portions, said rear portion of said lever being received in said aperture means, said spring member being held in a stressed position with one of said legs bearing against said cam means and the other of said legs bearing against said stop means, said spring member being movable with said rear portion of said lever means by pivoting said front portion of said lever means to selectively move said one leg from one rest position to another on said cam means, and said spring member being further stressed when moving over said active portion of said cam means from one rest position to another.

2. The device of claim 1 wherein at least said leg positioned against said stop means is formed with a deformed portion defining first locking means, said stop means on said rear portion of said lever means including a portion defining second locking means, said first and second locking means being cooperatively engaged to prevent rotation of said spring member on said rear portion of said lever means.

3. The device of claim 2 wherein each of said legs is formed with said deformed portion defining said first locking means, and each of said legs is selectively positionable either against said stop means or against said cam means in assembling said spring member on said rear portion of said lever means.

4. The device of claim 2 wherein said aperture means in said legs of said spring member are elongated and have long dimensions and short dimensions, said first locking means comprising recess means extending substantially transversely of the long dimension of said elongated aperture means, and said second locking means comprising a portion of said stop means received in said recess.

5. The device of claim 4 wherein said legs have longitudinal axes and said elongated aperture means have their long dimensions lying substantially on said longitudinal axes of said legs, said recess means being at substantially right angles to said longitudinal axis of said leg.

6. The device of claim 5 wherein said recess means is formed in said leg on both sides of said short dimension of said elongated aperture.

7. The device of claim 1 wherein said stop means is formed integrally with said rear portion of said lever means.

8. The device of claim 7 wherein said lever has enlarged abutment means on said front portion thereof and said stop means comprises first and second projections on opposite sides of said rear portion of said lever, said lever being formed with guide means between said abutment means and said stop means, said cam means including substantially flat face means adjacent the edge portion of said hole in said mounting member, said substantially flat face means cooperating with said guide means to prevent rotation of said lever means, said hole having at least one dimension slightly greater than a dimension defined by the diameter of said rear portion of said lever and the lateral extent of one of said first and second projections, and the distance between said guide means and said stop means being greater than the distance from said substantially flat face means to the rear edge of said cam means.

References Cited

UNITED STATES PATENTS

| 2,327,393 | 8/1943 | Beeke et al. | 4—199 |
| 3,125,764 | 3/1964 | Young | 4—204 |

LAVERNE D. GEIGER, Primary Examiner

R. J. SHER, Assistant Examiner

U.S. Cl. X.R.

74—97, 100; 267—164